United States Patent
Coffey et al.

(10) Patent No.: US 11,149,778 B2
(45) Date of Patent: Oct. 19, 2021

(54) MULTIPLE NUTPLATE ROTARY ABRASION TOOL

(71) Applicant: Lockheed Martin Corporation, Bethesda, MD (US)

(72) Inventors: Kevin Aaron Coffey, Grapevine, TX (US); David Haynes Coleman, Fort Worth, TX (US); Stuart C. Street, Aledo, TX (US); Steven E. Twaddle, Aledo, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 271 days.

(21) Appl. No.: 15/631,017

(22) Filed: Jun. 23, 2017

(65) Prior Publication Data

US 2018/0372143 A1 Dec. 27, 2018

(51) Int. Cl.
*B24B 7/16* (2006.01)
*B24B 23/02* (2006.01)
(Continued)

(52) U.S. Cl.
CPC ............ *F16B 37/041* (2013.01); *B24B 7/162* (2013.01); *B24B 23/02* (2013.01); *B24B 23/08* (2013.01);
(Continued)

(58) Field of Classification Search
CPC ........... B24B 7/16; B24B 7/162; B24B 7/165; B24B 7/167; B24B 23/02; B24B 37/04;
(Continued)

(56) References Cited

U.S. PATENT DOCUMENTS 2,208,879 A * 7/1940 Blazek ...................... B24B 7/16
266/57
2,922,261 A * 1/1960 Rabkin ................. B24B 23/022
451/359
(Continued)

FOREIGN PATENT DOCUMENTS

| CN | 104190644 A | 12/2014 |
| GB | 02057930 A | 4/1981 |

OTHER PUBLICATIONS

EPO Communication, Ref. JL94487P.EPP, Appln. 18170290.3-1016/3417998, dated Dec. 17, 2018.

*Primary Examiner* — Eileen P Morgan
*Assistant Examiner* — Marcel T Dion
(74) *Attorney, Agent, or Firm* — Baker Botts L.L.P.

(57) ABSTRACT

A system includes an abrasion assembly containing one or more abrasion pads configured to clean a faying surface of multiple nutplates, and a shaft attached to at least one of the abrasion pads and configured to rotate some or all of the abrasion pads during cleaning, wherein cleaning includes abrading the faying surfaces with the abrasion pads. The system also includes a base configured to attach to a pressure applicator, and a pressure applicator configured to attach to the base, hold the nutplates such that the faying surface of each nutplate is capable of contacting one of the abrasion pads, and apply pressure to the nutplates such that each of the nutplates contact one of the abrasion pads during the cleaning. Furthermore, the abrasion assembly is configured to rotate the abrasion pads within at least one of the base and the pressure applicator during cleaning.

8 Claims, 6 Drawing Sheets

(51) Int. Cl.
  *B24B 23/08* (2006.01)
  *B24B 41/047* (2006.01)
  *B24B 41/06* (2012.01)
  *F16B 37/04* (2006.01)
  *B24B 55/00* (2006.01)

(52) U.S. Cl.
  CPC ........ *B24B 41/0475* (2013.01); *B24B 41/065* (2013.01); *B24B 41/06* (2013.01); *B24B 55/00* (2013.01)

(58) Field of Classification Search
  CPC ... B24B 37/30; B24B 41/047; B24B 41/0475; B24B 41/065; B24B 19/22; B24B 19/226; B24B 23/022; B24B 23/08; B24B 41/06; B24B 55/00; F16B 37/041
  USPC .......... 451/278, 282, 386, 548, 557
  See application file for complete search history.

(56) References Cited

U.S. PATENT DOCUMENTS

| | | | |
|---|---|---|---|
| 2,927,336 A | 3/1960 | Sauer | |
| 2,948,087 A * | 8/1960 | Caton | B24B 7/12 15/77 |
| 2,956,380 A * | 10/1960 | Yule | B24B 23/02 451/431 |
| 3,067,550 A | 12/1962 | Schultz | |
| 3,233,370 A * | 2/1966 | Best | B24B 37/102 451/286 |
| 3,742,652 A | 7/1973 | Enders | |
| 3,747,278 A | 7/1973 | Wolda | |
| 3,812,626 A | 5/1974 | Thompson | |
| 3,983,664 A | 10/1976 | Martin | |
| 4,317,282 A | 3/1982 | Pace | |
| 4,327,466 A * | 5/1982 | Yanagida | A46B 13/02 15/77 |
| 4,459,785 A * | 7/1984 | Zimmer | B23B 31/113 403/348 |
| 4,468,894 A * | 9/1984 | Hong | B24B 3/54 451/282 |
| 5,005,244 A | 4/1991 | Muraguchi | |
| 5,038,525 A | 8/1991 | Gardner | |
| 5,556,327 A * | 9/1996 | Jenkins | B24B 3/48 269/58 |
| 6,643,881 B1 * | 11/2003 | Shim | A63B 47/04 15/21.2 |
| 6,735,805 B2 | 5/2004 | Chapin | |
| 6,932,684 B1 * | 8/2005 | Hunt | B24B 3/361 451/264 |
| 7,308,727 B2 | 12/2007 | Pidlysny | |
| 2001/0018321 A1 * | 8/2001 | Heijkenskjold | B24B 7/16 451/279 |
| 2002/0155718 A1 * | 10/2002 | Nguyen | B24B 37/042 438/692 |
| 2003/0104766 A1 * | 6/2003 | Doy | B24B 37/04 451/41 |
| 2005/0164611 A1 * | 7/2005 | Fukao | B24B 7/17 451/52 |
| 2009/0203299 A1 * | 8/2009 | Kashiwa | B24B 7/228 451/360 |
| 2009/0318059 A1 * | 12/2009 | Shewey | B24B 37/04 451/5 |
| 2010/0087124 A1 * | 4/2010 | Saghian | B24B 29/04 451/57 |
| 2014/0283363 A1 | 9/2014 | Wilkerson et al. | |
| 2018/0246016 A1 * | 8/2018 | Hauck | B24B 41/067 |

* cited by examiner

MULTIPLE NUTPLATE ROTARY ABRASION TOOL

TECHNICAL FIELD

This disclosure relates in general to nutplate preparation, and more specifically to abrasion systems for nutplate preparation.

BACKGROUND

Nutplates are often used to create a binding location on a surface, such as on aircraft, boats, etc. An example nutplate contains a nut connected to a plate, where the plate attaches to a surface and the nut provides a location to accept a bolt passing through the surface (a binding location). Nutplates can sometimes be found on the inside of surfaces, such as on the inside surface of an aircraft body or boat hull, where it is difficult or impossible to place a nut after the surface is assembled or placed on the body or hull without causing damage. The plate of the nutplate is often attached to the surface, sometimes with an adhesive, and thus, the cleaner the plate of the nutplate, the more reliable or strong the bond between the plate and the surface in some instances.

SUMMARY OF THE DISCLOSURE

According to one embodiment, a system contains an abrasion assembly, which includes one or more abrasion pads configured to clean a faying surface of each of a plurality of nutplates, and a first shaft attached to at least one of the one or more abrasion pads and configured to rotate at least one of the one or more abrasion pads during cleaning of the nutplates, wherein cleaning the nutplates includes abrading each of the faying surfaces with at least one of the one or more abrasion pads. The system also contains a base configured to attach to a pressure applicator, and the pressure applicator, which is configured to attach to the base, hold the plurality of nutplates such that the faying surface of each nutplate is capable of contacting at least one of the one or more abrasion pads during the cleaning of the nutplates, and apply pressure to the plurality of nutplates such that each of the plurality of nutplates contact at least one of the one or more abrasion pads during the cleaning of the nutplates. Furthermore, the abrasion assembly is configured to rotate the one or more abrasion pads within at least one of the base and the pressure applicator during the cleaning of the nutplates.

According to another embodiment, a system includes one or more abrasion pads configured to clean a faying surface of each of a plurality of nutplates and a base, the base being configured to attach to a pressure applicator and hold the one or more abrasion pads within at least one of the base and the pressure applicator during the cleaning of the nutplates, wherein cleaning the nutplates includes abrading each of the faying surfaces with at least one of the one or more abrasion pads. The system also includes the pressure applicator, the pressure applicator being configured to attach to the base, hold the plurality of nutplates such that the faying surface of each nutplate is capable of contacting at least one of the one or more abrasion pads during the cleaning of the nutplates, and apply pressure to the plurality of nutplates such that each of the plurality of nutplates contact at least one of the one or more abrasion pads during the cleaning of the nutplates.

Technical advantages of certain embodiments may include systems and methods for obtaining cleaner nutplates, and in particular cleaner faying surfaces on nutplates. By obtaining cleaner faying surfaces, nutplates can be more securely attached to surfaces, especially when adhesives are applied to the faying surfaces. Furthermore, some embodiments increase the efficiency or effectiveness of abrasive nutplate cleaning and provide a more consistent cleaning experience and result. Similarly, certain embodiments clean nutplates more quickly than traditional abrasion techniques. Certain embodiments also provide a way to clean nutplates, using abrasion techniques, that is safer for operators and exposes them to less risk of injury. In addition, systems and methods of this disclosure may more efficiently and/or quickly clean multiple nutplates at the same time using an abrasion technique compared to other systems and methods. Furthermore, certain embodiments of this disclosure may reduce the need to use expensive special packaging for nutplates, thus reducing the cost of nutplates. Some embodiments may also make cleaning a nutplate that has been dropped on the floor or otherwise contaminated feasible, which may result in fewer wasted nutplates and greater cost savings.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

In every-day life, nutplates are often used to create a binding location on a surface, such as on aircraft, boats, etc. An example nutplate contains a nut connected to a plate, where the plate attaches to a surface and the nut provides a location to accept a bolt passing through the surface (a binding location). Nutplates can sometimes be found on the inside of surfaces, such as on the inside surface of an aircraft body or boat hull, where it is difficult or impossible to place a nut after the surface is assembled or placed on the body or hull. The plate of the nutplate is often attached to the surface, sometimes with an adhesive, and thus, the cleaner the plate of the nutplate, the more reliable or strong the bond between the plate and the surface in some instances.

Certain embodiments of the present disclosure describe systems and methods of cleaning nutplate surfaces, such as nutplate faying surfaces. A faying surface on a nutplate is generally a surface that forms part of a joint or attachment to another surface. For example, adhesives are sometimes placed on a faying surface of a nutplate, and then the faying surface is pressed against a surface to which the nutplate will be bound.

One way to clean a faying surface is abrasion cleaning, which uses an abrasive surface (e.g., an abrasion pad) to physically scour away contaminants from a nutplate faying surface. Certain embodiments of the present disclosure disclose systems and methods for cleaning a single nutplate at a time using abrasive cleaning. For example, a rotary tool can be attached to such embodiments and rotate an abrasive pad against a faying surface of a nutplate.

Additionally, certain embodiments of the present disclosure disclose systems and methods for cleaning multiple nutplates at a time using abrasive cleaning. For example, a rotary tool can be attached to such embodiments and rotate one or more abrasive pads at the same time against multiple nutplates.

Technical advantages of certain embodiments may include systems and methods for obtaining cleaner nutplates, and in particular cleaner faying surfaces on nutplates. By obtaining cleaner faying surfaces, nutplates can be more securely attached to surfaces, especially when adhesives are applied to the faying surfaces. Furthermore, some embodiments increase the efficiency or effectiveness of abrasive nutplate cleaning and provide a more consistent cleaning experience and result. Similarly, certain embodiments clean nutplates more quickly than traditional abrasion techniques. Certain embodiments also provide a way to clean nutplates, using abrasion techniques, that is safer for operators and exposes them to less risk of injury. In addition, systems and methods of this disclosure may more efficiently and/or quickly clean multiple nutplates at the same time using an abrasion technique compared to other systems and methods. Furthermore, certain embodiments of this disclosure may reduce the need to use expensive special packaging for nutplates, thus reducing the cost of nutplates. Some embodiments may also make cleaning a nutplate that has been dropped on the floor or otherwise contaminated feasible, which may result in fewer wasted nutplates and greater cost savings. Other technical advantages will be readily apparent to one skilled in the art from the following figures, descriptions, and claims. Moreover, while specific advantages have been enumerated above, various embodiments may include all, some, or none of the enumerated advantages.

Figure 1A:
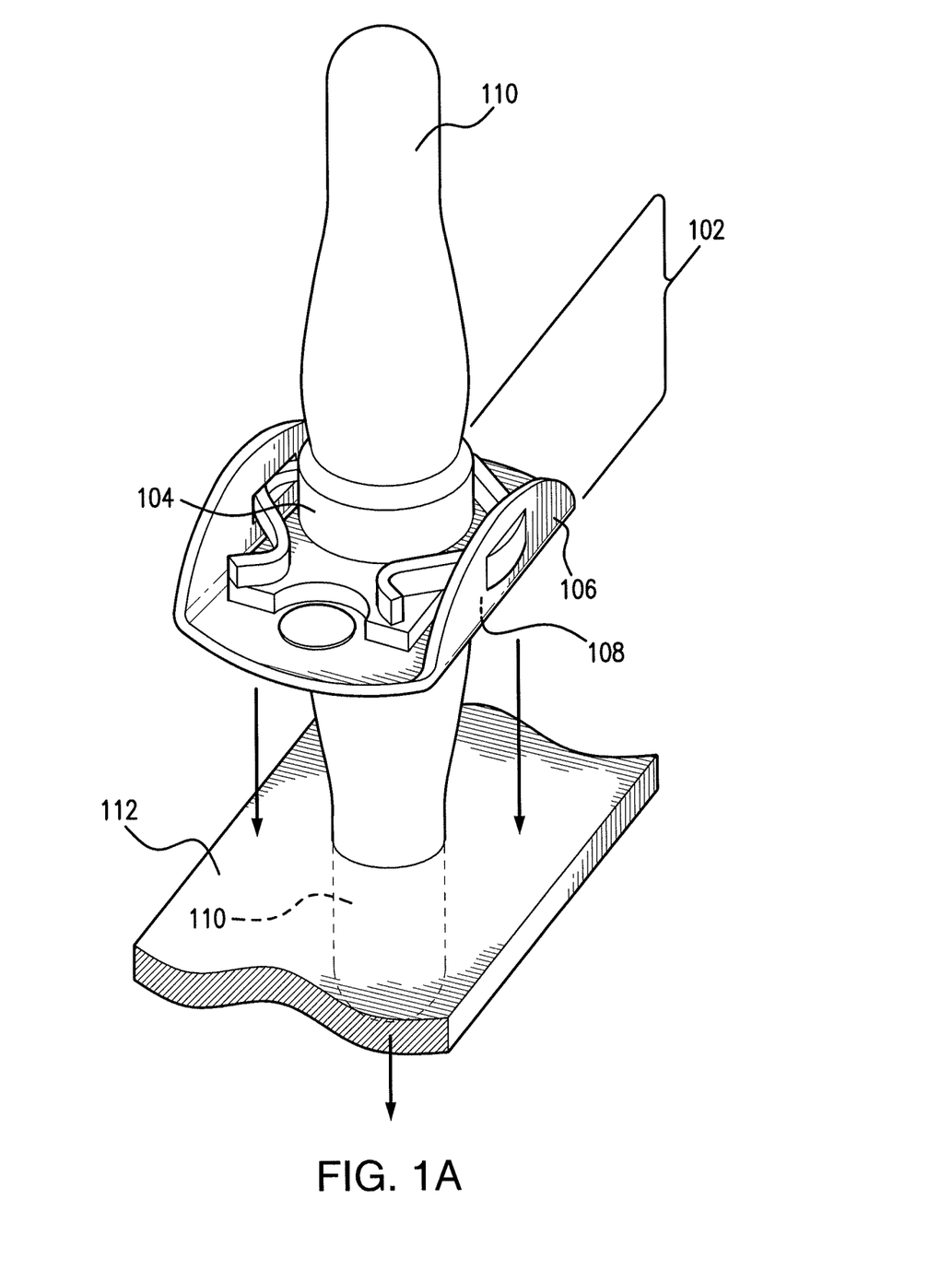
FIGS. 1A and 1B illustrate an example nutplate and surface, according to a particular embodiment.
Figure 1B:
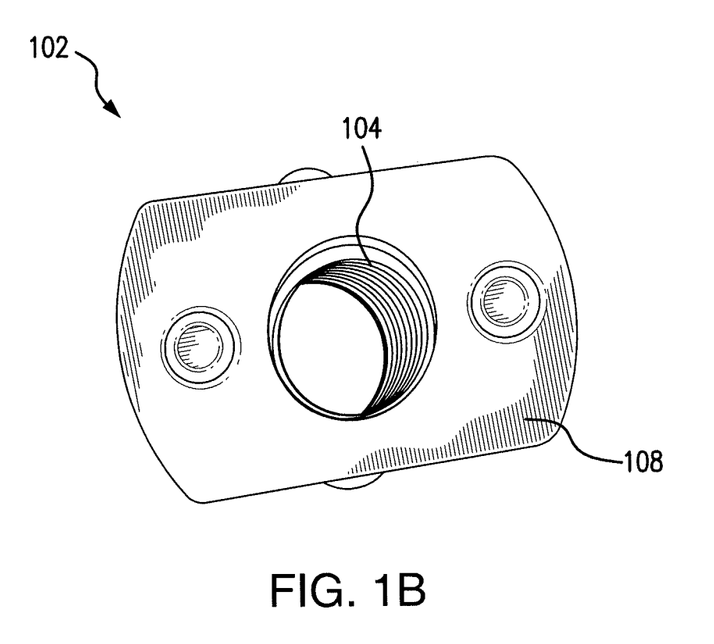

FIGS. 1A and 1B illustrate an example nutplate 102 and surface 112, according to a particular embodiment. In some embodiments, nutplate 102 is joined to surface 112 such that one or more bolts, screws, rivets, or other fasteners can pass through both surface 112 and nutplate 102, attach to nut 104 of nutplate 102, and thus attach, secure, or otherwise affix surface 112 in place or to another surface or component. In particular embodiments, nutplate 102 contains nut 104 and plate 106, where plate 106 has a faying surface 108. In addition, in some embodiments, nutplate 102 has a worm 110 passing through nut 104 and plate 106.

Nutplate 102 is generally a component that allows a nut, e.g., nut 104, to be positioned on or in close proximity to a surface, e.g., surface 112. Nutplate 102, in certain embodiments, contains plate 106 and nut 104, where nutplate attaches to a surface, e.g., surface 112, via a connection between plate 106 and surface 112 at faying surface 108. For example, an adhesive may be placed between plate 106 and surface 112 such that plate 106 (and thus nutplate 102) is bonded to surface 112. Any suitable nutplate of any suitable configuration is contemplated. As examples, nutplates having nuts that accept 6/16", 5/16", 4/16", 3/16" etc. bolts may be used. Additional examples include open style nutplates and dome nutplates.

Nut 104 generally acts as a location for fasteners, such as bolts, screws, rivets, etc. to attach/fasten. A "nut" as used in this application may be any suitable location for a fastener, for example a component with a cylindrical/circular, rectilinear, or hexagonal opening that allows a fastener to at least partially pass through the opening and attach to the nut. For example, nut 104 may have threads for a bolt or screw on its inside surface (this area in FIG. 1 is filled with worm 110). In an example nutplate 102, nut 104 is attached to plate 106 via any suitable means, such as welding, press fitting, use of adhesives, etc. In some embodiments, nut 104 is coupled to plate 106 in such a way that allows nut 104 to be free floating (e.g., nut 104 may rotate or tilt a limited amount to accommodate certain tolerances). In certain embodiments, a face or portion of nut 104 may extend through a portion of plate 106 (e.g., such that a face of nut 104 is flush with plate 106), such that the surface or portion of nut 106 is a faying surface or part of a larger faying surface (such as faying surface 108). Nut 104 can be made of any suitable material such as steel, aluminum, or other metals, a metal alloy, polymer, ceramic, etc.

Plate 106 generally provides a surface to which nut 104 can attach, and a surface to which a surface (e.g., surface 112) can attach to nutplate 102. In example embodiments, plate 106 may have an opening centered with (or otherwise over) an opening of nut 104 that allows a fastener to pass through plate 106 and make contact with nut 104. Plate 106 can be made of any suitable material such as steel, aluminum, or other metals, a metal alloy, polymer, ceramic, etc.

Faying surface 108 is generally a surface of plate 106 that attaches to another surface, such as surface 112. Faying surface 108 may attach to surface 112 via any suitable means, such as with an adhesive, welding, press fitting, etc. In certain embodiments, faying surface 108 should be clean (e.g., have few contaminants on its surface) such that a strong bond (e.g., via use of an adhesive) can form between plate 106 and surface 112. Faying surface 108, in certain embodiments, may include some of nut 104, such as a face of nut 104 protruding through a portion of plate 106. In some embodiments, the cleaner faying surface 106, the stronger the bond between nutplate 102, via plate 106, and surface 112.

Worm 110 generally provides the ability to manipulate nutplate 102 and keeps the inside surface(s) of nut 104 (where, e.g., a fastener fastens to nut 104) clean and free of debris or other contaminants. For example, worm 110 may extend past plate 106 and pass through an opening in surface 112 such that an operator or device can grab worm 110 and pull it further through the opening of surface 112, thereby seating faying surface 108 on surface 112 and aligning the opening in surface 112, plate 106 and nut 104. Worm 110 may also extend below nut 104 in some embodiments. In certain embodiments, once nutplate 102 is attached to surface 112, worm 110 can be removed from nutplate 102, thus exposing inside surfaces of nut 104 and allowing a fastener to fasten to nut 104. In addition, in some embodiments, worm 110 keeps the inside surface(s) of nut 104 (e.g., threads for a bolt) clean by keeping debris, oil, and other contaminants off of the inside surface(s) of nut 104. Worm 110 can be made of any suitable substance, such as silicone, rubber, polymer, wax, etc.

Surface 112 is generally any surface to which nutplate 102 can attach. In certain embodiments, surface 112 may have an opening that a fastener can pass through, and nutplate 102 can attach to surface 112 such that openings in plate 106 and nut 104 align with the opening in surface 112. In such embodiments, the fastener may be able to pass through surface 112, plate 106, at least partially through nut 104, and fasten to nut 104. In an example embodiment, surface 112 may be an outer panel of an aircraft wing with an opening for a bolt, and nutplate 102 may attach to the inside of the aircraft wing such that the bolt can pass through surface 112 and be threaded into or out of the nutplate from the outside of the wing.

Figure 2A:
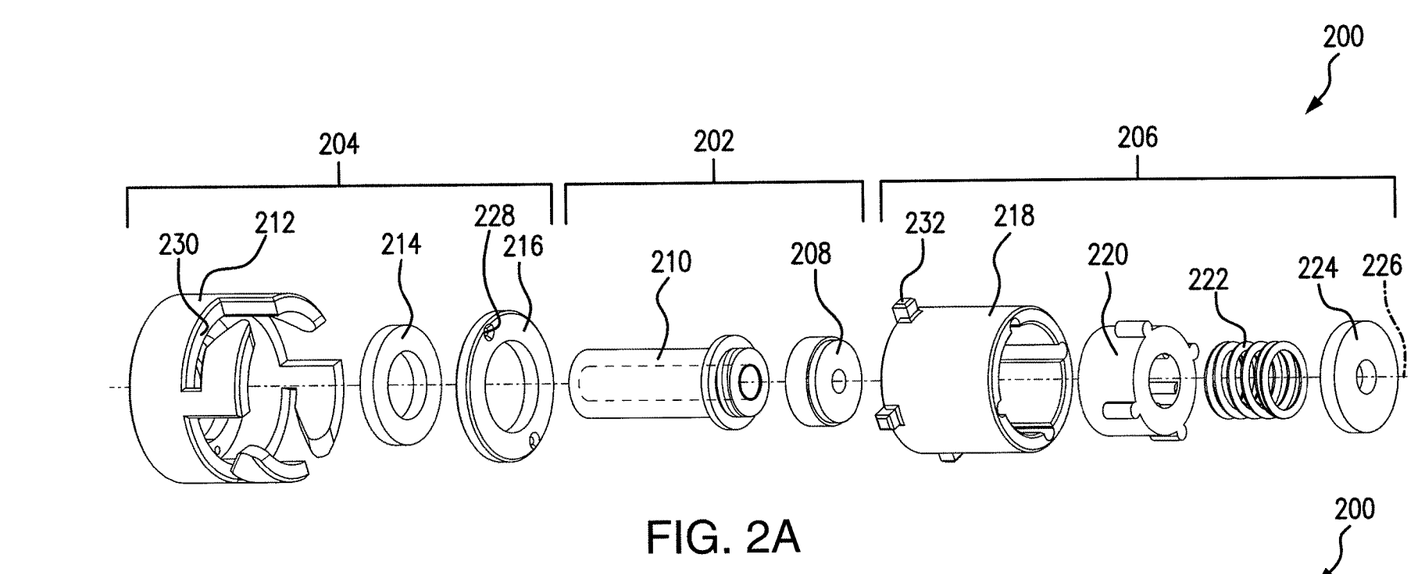
FIGS. 2A and 2B illustrate an exploded view of a rotary abrasion tool from two different angles, according to an example embodiment of the present disclosure.
Figure 2B:
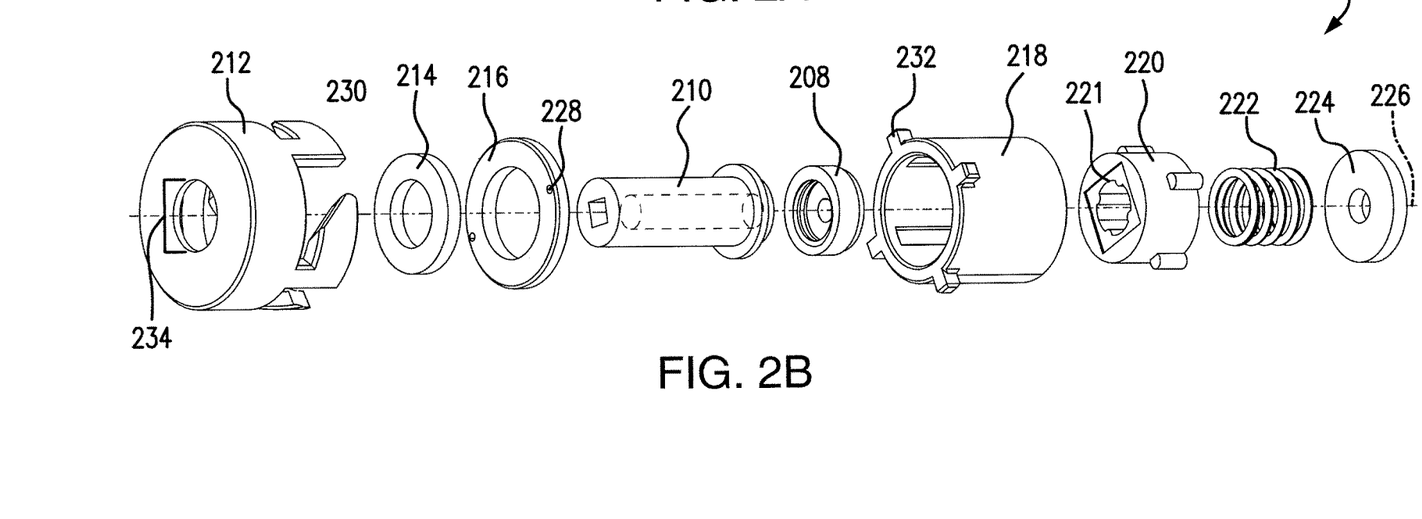

FIGS. 2A and 2B illustrate an exploded view of a rotary abrasion tool 200 from two different angles, according to an example embodiment of the present disclosure. FIGS. 2A and 2B illustrate the same rotary abrasion tool 200, but provide different perspectives for clarity. In general, rotary abrasion tool 200 cleans a nutplate (e.g., nutplate 102 of FIG. 1), such as a nutplate faying surface (e.g., faying surface 108 of FIG. 1). In certain embodiments, a nutplate is placed inside rotary abrasion tool 200 (e.g., between abrasion pad 208 and nutplate holder 220) and then cleaned by abrasion. Rotary abrasion tool 200 contains three main portions: an abrasion component 202, a base 204, and a pressure applicator 206. Abrasion component 202 contains an abrasion pad 208 and a shaft 210. Base 204 contains a platform 212, a bearing 214, and a washer 216. Pressure applicator 206 contains a housing 218, a nutplate holder 220, a spring 222, and a cap 224.

In some embodiments, abrasion component 202 rotates (to provide an abrasive cleaning action) inside of base 204 and pressure applicator 206, which are connected to one another. In addition, pressure applicator 206 holds a nutplate in position such that abrasion component 202 can clean at least a portion of the nutplate when base 204 is attached to pressure applicator 206 in certain embodiments. In particular embodiments, abrasion component 202 is configured to rotate abrasion pad 208 within at least one of the base and the pressure applicator during nutplate cleaning.

In certain embodiments, some or all of the components of rotary abrasion tool 200 may have openings along central axis 226. Such openings may, in some embodiments, be configured to allow for protrusions from different types of nutplates, such as worm 110 from FIG. 1 or a cap from a dome-style nutplate, to pass through some or all of rotary abrasion tool 200. By passing through some or all of rotary abrasion tool 200, tool 200 may not exert as much or any pressure on such protrusions when rotary abrasion tool 200 is cleaning a surface of a nutplate, e.g., faying surface 108. Cleaning may involve applying pressure between abrasion pad 208, for example, and a nutplate, and therefore in some embodiments openings along central axis 226 may allow for such pressure to be applied to a faying surface of a nutplate but not other portions of a nutplate, such as a worm or dome cap.

Abrasion component 202, in certain embodiments, contains abrasion pad 208 and shaft 210. Abrasion pad 208, in general, is an abrasive surface that cleans one or more surfaces of a nutplate, such as a faying surface. Abrasion pad 208, in certain embodiments, is disposable or replaceable, e.g., after being used once, after its abrasive properties have been diminished with use, or after it becomes dirty/contaminated. For example, abrasion pad 208 may be threaded such that it can be attached to shaft 210 by being threaded on to and off of shaft 210. In other embodiments, abrasion pad 208 is affixed to shaft 210 and is not removable, though the combination of shaft 210 and abrasion pad 208 may be disposable. Abrasion pad 208 may be any suitable abrasive material, such as metal, fiber, sand grit, sandpaper, stone, ceramic, polymer, etc. Abrasion pad 208 may be multilayered and made of one or more different materials. Abrasion pad 208 is attached to shaft 210 in certain embodiments, and may rotate with shaft 210 to provide an abrasive cleaning action.

Shaft 210 generally attaches to abrasion pad 208 and rotates. In certain embodiments, shaft 210 attaches (e.g., at an end opposite of where abrasion pad 208 is positioned) to a power tool, a hand crank, a ratchet tool, or any other tool which provides rotational motion and rotates shaft 210. Shaft 210, in such embodiments, rotates abrasion pad 208 in turn to create a cleaning action. Shaft 210 attaches to abrasion pad 208 in any suitable manner, and attaches to a power tool or hand crank in any suitable manner (e.g., via a coupling slot). In certain embodiments, some or all of shaft 210 is hollow to allow objects connected to or part of a nutplate to pass through shaft 210. For example, shaft 210 may have a cylindrical opening that allows a portion of a worm (e.g., worm 110 from FIG. 1) to pass through shaft 210 such that abrasion pad 208 can make contact with a faying surface of the nutplate. Shaft 210 may be made of any suitable material, such as metal (steel, aluminum, etc.), polymer, etc.

Base 204, in certain embodiments, contains platform 212, bearing 214, and washer 216. Platform 212 generally provides a structural base or attachment point for other components of base 204 and/or some or all of the components of pressure applicator 206. For example, other components of base 204 may rest in, connect to, or be held in place by platform 212 in certain embodiments. Washer 216 may connect to platform 212 in certain embodiments, for example by being bolted or screwed into platform 212 via bolt holes 228. In some embodiments, washer 216 may connect to platform 212 such that bearing 214 is located between platform 212 and washer 216 and locked in place. In such embodiments, washer 216 affixes bearing 214 in position by connecting to platform 212. In certain embodiments, platform 212 holds abrasion pad 208 (which may or may not be connected to shaft 210) within one of base 204 and pressure applicator 206 during nutplate cleaning.

Moreover, platform 212 may couple/attach to pressure applicator 206 (including one or more components thereof). For example, platform 212 may couple/attach to housing 218 using any suitable connection. In an example embodiment, platform 212 may have grooves 230 that are configured to connect to protrusions 232 on housing 218. In some embodiments, platform 212 or housing 218 may be configured to rotate to lock/seat protrusions 232 into grooves 230, thus connecting base 204 to pressure applicator 206. Platform 212, in particular embodiments, may have more than one set of grooves 230, where each different set of grooves are meant to be used with different sized and shaped nutplates. For example, if a first type of nutplate to be cleaned is relatively thin, then a first set of grooves 230 located closer to pressure applicator 206 on platform 212 may be used. Alternatively, if a second type of nutplate to be cleaned is relatively thick, then a second set of grooves 230 located further from pressure applicator 206 on platform 212 may be used. Similarly, housing 218 may have different sets of protrusions 232 located on different portions of housing 218 to accommodate nutplates of different shapes and sizes.

Platform 212 may also have an opening 234, e.g., centered along center axis 226, that allows some of shaft 210 to pass through in some embodiments. In certain embodiments, an end of shaft 210 opposite to an end connected to abrasive pad 208 passes through opening 234 in platform 212 in order to connect with a power tool or hand crank for rotational motion. Platform 212, in some embodiments, does not rotate when shaft 210 rotates, e.g., because bearing 214 makes contact with shaft 210 instead of platform 212. Platform 212 may have any suitable shape and may be made of any suitable material, such as metal (steel, aluminum, etc.), polymer, etc.

Bearing 214 generally reduces friction between a rotating shaft 210 and platform 212, or allows shaft 210 to rotate without platform 212 rotating, in example embodiments. In certain embodiments, shaft 210 passes through platform 212 and rotates. To prevent friction between shaft 210 and platform 212 or to prevent platform 212 from rotating in some embodiments, bearing 214 is positioned within platform 212 and configured to make contact with shaft 210. By making contact with shaft 210, which may be rotating at a high RPM, bearing 214 allows some other portions of rotary abrasion tool 200 (e.g., washer 216, platform 212, etc.) to not contact shaft 210 in some embodiments. Bearing 214 may be any suitable bearing, and may contain, e.g., ball bearings or other bearing materials. In certain embodiments, bearing 214 is affixed in place by washer 216, which may connect to platform 212. Bearing 214 and washer 216 may be made of any suitable material, such as metal (steel, aluminum, etc.), polymer, etc.

In certain embodiments, base 204, including any component thereof, may hold abrasion pad 208 within at least one of base 204 and pressure applicator 206 during nutplate cleaning.

Pressure applicator 206, in certain embodiments, contains housing 218, nutplate holder 220, spring 222, and cap 224. Housing 218, in general, contains some or all of the components of pressure applicator 206 and attaches to platform 212 or another portion of base 204 in certain embodiments. In particular embodiments, housing 218 acts as an attachment point between base 204 and pressure applicator 206 (e.g., be connecting to base 204 via protrusions 232 or any other suitable means). While the embodiment of FIGS. 2A and 2B shows protrusions 232 on housing 218 and grooves 230 on platform 212, in other embodiments platform 212 may have protrusions and housing 218 may have grooves. Housing 218 may also attach to or hold nutplate holder 220, for example by grooves and protrusions on housing 218 and nutplate holder 220, respectively, or vice versa. Housing 218 may have any suitable shape and may be made of any suitable material, such as metal (steel, aluminum, etc.), polymer, etc.

Nutplate holder 220 generally holds a nutplate or a portion of a nutplate during cleaning. For example, nutplate holder 220 may be shaped, carved, configured, etc. to physically seat (hold) a portion of a nutplate. In certain embodiments, the seated portion of the nutplate is not the surface being cleaned (e.g., the faying surface). As an example, FIG. 2B shows a rectilinear depression 221 with an opening, which are configured to seat a first portion of a nutplate such that a second portion of the nutplate can be accessed and cleaned by abrasion pad 208. Nutplate holder 220 may, e.g., via grooves and protrusions, connect with housing 218, and may or may not be able to slide all the way through housing 218. In particular embodiments, nutplate holder 220 is configured to connect with or slide into housing 218 from one end of housing 218 but not another end of housing 218. Nutplate holder 220 may, in some embodiments, be customized or otherwise configured to hold a particular nutplate type or style, and the dimensions of nutplate holder 220 (e.g., its height/length along central axis 226 and the dimensions of rectilinear depression 221) may differ for different nutplates in order to ensure that the nutplate being cleaned is positioned properly and/or has enough applied force against abrasion pad 208 when tool 200 is in use. Nutplate holder 220 may have any suitable shape and may be made of any suitable material, such as metal (steel, aluminum, etc.), polymer, etc.

Spring 222 in general provides pressure against one or more components of rotary abrasion tool 200. For example, spring 222, when compressed, presses against nutplate holder 220 and cap 224 in certain embodiments. In response, nutplate holder 220 is pressed downward into housing 218 towards abrasion pad 208, thus helping to apply pressure to a nutplate that is seated in nutplate holder 220 against abrasion pad 208. In this way, spring 222 ensures that abrasion pad 208 makes sufficient contact with (and thus cleans) a nutplate held by nutplate holder 220 in tool 200 in some embodiments. In certain embodiments, spring 222 may not be used or may be used in conjunction with other components that provide pressure such that a nutplate is pressed against abrasion pad 208. For example, grooves 230 and protrusions 232 may be configured such that twisting protrusions 230 into groves 230 pulls pressure applicator 206 closer to base 204 and provides pressure to press a nutplate held by nutplate holder 220 against abrasion pad 208. Spring 222 may have any suitable shape and may be made of any suitable material, such as metal (steel, aluminum, etc.), polymer, etc.

Cap 224 in general secures some or all components of rotary abrasion tool 200 in certain embodiments. For example, pressure caused by locking/seating pressure applicator 206 within platform 212 and/or spring 222 may tend to press certain components (e.g., nutplate holder 220 or spring 222 out of tool 200 (or pressure applicator 206). Thus, in particular embodiments, cap 224 is configured to contain such components within tool 200 during operation. For example, spring 222 may press against nutplate holder 220 and cap 224 when compressed. Cap 224 may be attached to housing 218, in certain embodiments, in any suitable way. For example, cap 224 may be welded, press fitted, or cast as part of housing 218. In certain embodiments, housing 218 may have a lip or locking mechanism that prevents cap 224 from traveling beyond the housing 218 in a certain direction. In such embodiments, cap 224 may only be able to be inserted from one end of housing 218 and be pressed against a lip or locking mechanism on another end of housing 218. In other embodiments, cap 224 may be inserted into one end of housing 218, and then a locking mechanism or lip may be put in place such that cap 224 cannot be removed until the locking mechanism or lip is removed. In certain embodiments, cap 224 may be part of housing 218. Cap 224 may have any suitable shape and may be made of any suitable material, such as metal (steel, aluminum, etc.), polymer, etc.

Some or all of the components of rotary abrasion tool 200 can be made by any suitable means, such as with a 3D printer, by casting, etc.

While FIGS. 2A and 2B illustrate a particular embodiment of a rotary abrasion tool 220 having particular components, this disclosure contemplates rotary abrasion tools having some or all of the described components, as well as additional components not described. Components of the present disclosure may be any suitable shape and may be in any suitable configuration.

Figure 3:
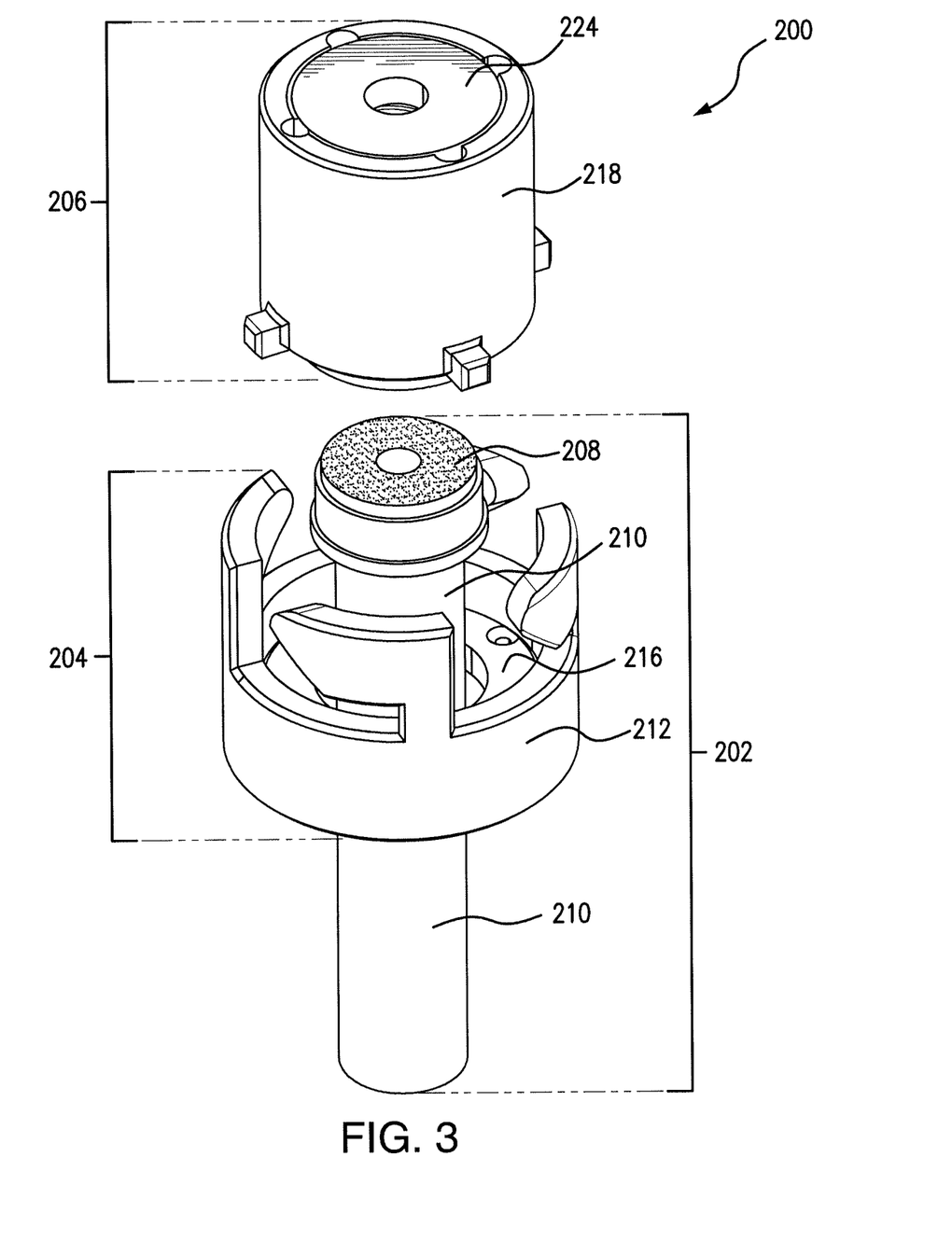
FIG. 3 illustrates a non-exploded view of rotary abrasion tool, according to an example embodiment of the present disclosure.

FIG. 3 illustrates a non-exploded view of rotary abrasion tool 200, according to an example embodiment of the present disclosure. More specifically, FIG. 3 shows components of pressure applicator 206 inside housing 218, components of abrasion component 202 extending through base 204 such that abrasion pad 208 is between base 204 and pressure applicator 206, and components of base 204 assembled together.

Pressure applicator 206 is illustrated with only housing 218 and cap 224 showing, though nutplate holder 220 and spring 222 of FIG. 2 may be contained within housing 218 in certain embodiments.

Base 204 is illustrated with washer 216 bolted to platform 212. In certain embodiments, bearing 214 of FIG. 2 is located between washer 216 and platform 212 and may contact shaft 210.

Abrasion component 202 is illustrated with shaft 210 extending through opening 234 of FIG. 2, through base 204, and connecting to abrasion pad 208, which is positioned between base 204 and pressure applicator 206.

In certain embodiments, pressure applicator 206 and base 204 are attached to one another, thereby pressing abrasion pad 208 against a nutplate held by, seated on, or resting in pressure applicator 206. In some embodiments, shaft 210 is attached to a power tool or a hand crank or otherwise rotated such that abrasion pad 208 cleans (abrades) a portion of a nutplate within rotary abrasion tool 200.

Figure 4A:
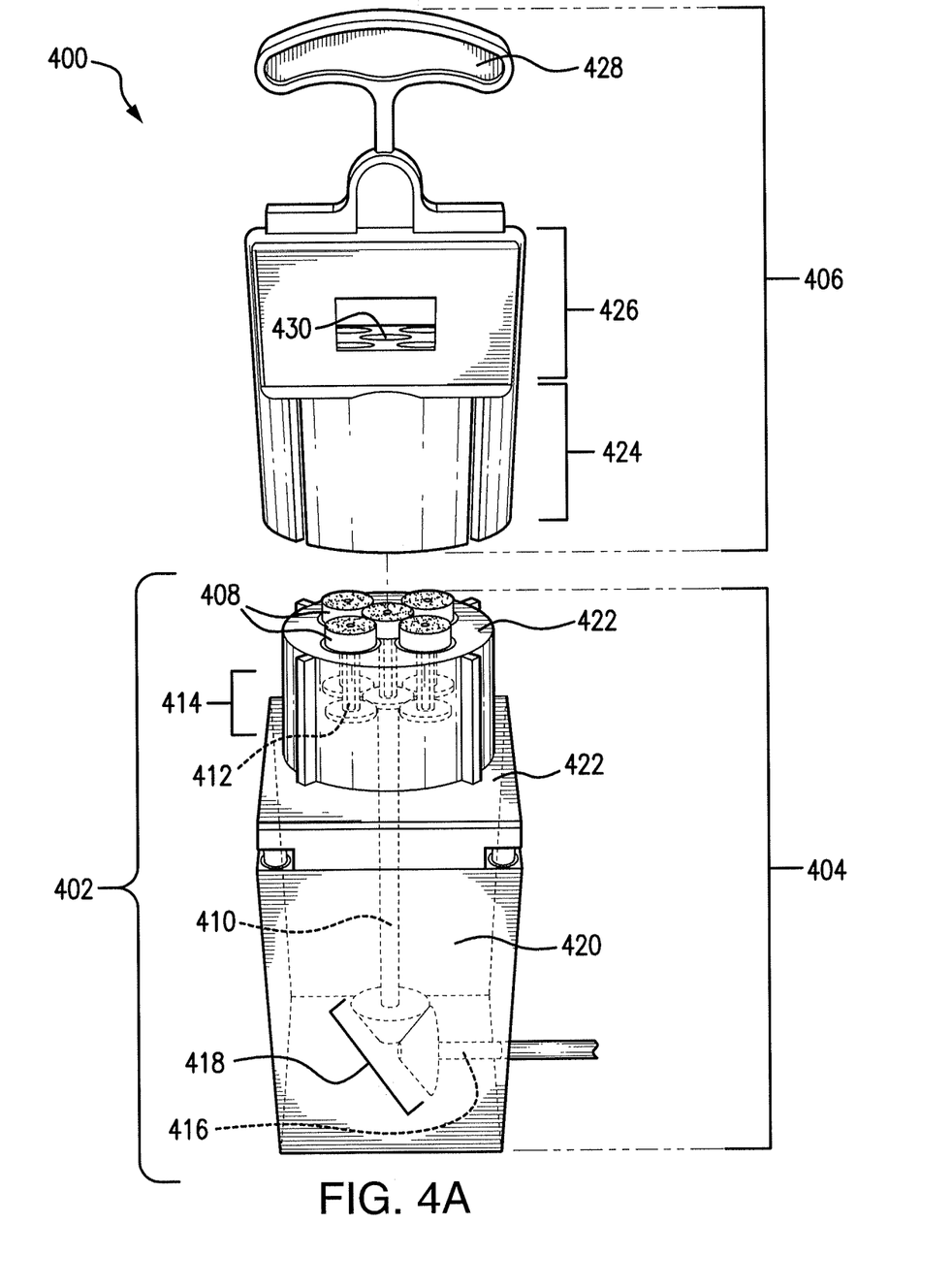
FIG. 4A illustrates a multi-unit rotary abrasion tool (MU-RAT), according to an example embodiment of the present disclosure.

FIG. 4A illustrates a multi-unit rotary abrasion tool (MU-RAT) 400, according to an example embodiment of the present disclosure. In general, multi-unit rotary abrasion tool 400 cleans more than one nutplate (e.g., nutplates 102 of FIG. 1), e.g., nutplate faying surfaces (such as faying surface 108 of FIG. 1). In certain embodiments, nutplates are placed inside MURAT 400 (e.g., between abrasion pads 408 and pressure applicator 406) and then cleaned by abrasion. MURAT 400 contains three main portions: an abrasion assembly 402, a base 404, and a pressure applicator 406. Abrasion assembly 402 contains one or more abrasion pads 408, a primary shaft 410, secondary shafts 412, gears 414, a drive shaft 416, and shaft gears 418. Base 404 contains a platform 420 and a base coupling component 422. Pressure applicator 406 contains a pressure applicator coupling component 424, a nutplate holder 426, and a handle 428.

Figure 4B:
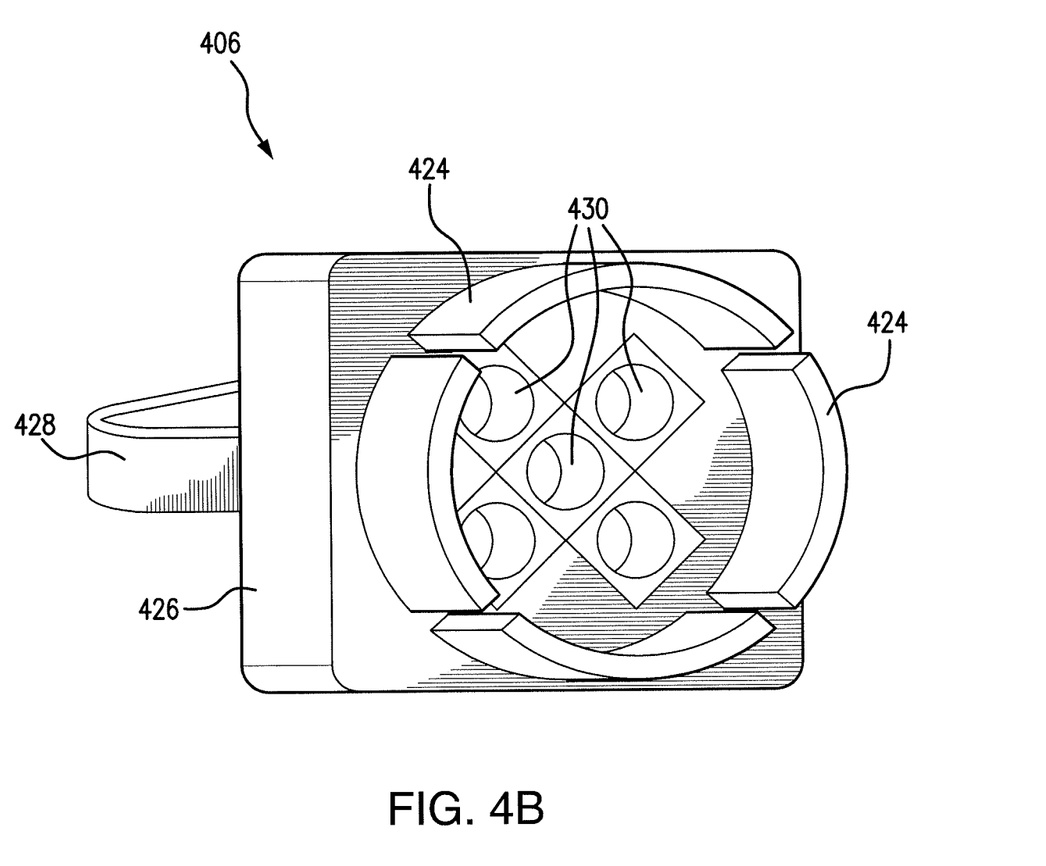
FIG. 4B illustrates the pressure applicator shown in FIG. 4A from a different angle, according to an example embodiment of the present disclosure.

FIG. 4B illustrates the pressure applicator 406 shown in FIG. 4A from a different angle, according to an example embodiment of the present disclosure.

In some embodiments, abrasion assembly 402 rotates (to provide an abrasive cleaning action) inside of base 404 and pressure applicator 406, which are connected to one another. In addition, pressure applicator 406 holds a nutplate in position such that abrasion assembly 402 can clean at least a portion of multiple nutplates when base 404 is attached to or in contact with pressure applicator 406 in certain embodiments. In particular embodiments, abrasion assembly 402 is configured to rotate one or more abrasion pads 408 within at least one of base 404 and pressure applicator 406 during nutplate cleaning.

In certain embodiments, some or all of the components of MURAT 400 may have openings that are configured to allow for protrusions from different types of nutplates, such as worm 110 from FIG. 1 or a cap from a dome-style nutplate, to pass through some or all of MURAT 400. By passing through some or all of MURAT 400, MURAT 400 may not exert as much or any pressure on such protrusions when MURAT 400 is cleaning a surface of a nutplate, e.g., faying surface 108. Cleaning may involve applying pressure between abrasion pads 408, for example, and a nutplate, and therefore in some embodiments openings may allow for such pressure to be applied to a faying surface of a nutplate but not other portions of a nutplate, such as a worm or dome cap. As an example, openings 430 in nutplate holder 426 and openings in abrasion pads 408 may allow for portions of nutplates being cleaned to pass through.

Abrasion assembly 402, in certain embodiments, contains one or more abrasion pads 408, primary shaft 410, secondary shafts 412, gears 414, drive shaft 416, and shaft gears 418. Abrasion pads 408, in general, are abrasive surfaces (or a single abrasive surface) that cleans one or more surfaces of multiple nutplates (e.g., nutplate faying surfaces). Abrasion pads 408, in certain embodiments, are disposable or replaceable, e.g., after being used once, after its abrasive properties have been diminished with use, or after it becomes dirty/contaminated. For example, abrasion pads 408 may be threaded such that they can be attached to primary shaft 410 or secondary shafts 412 by being threaded on to and off of such shafts. In other embodiments, abrasion pads 408 are affixed to primary shaft 410 or secondary shafts 412 and are not removable, though the combination of shafts 410 and 412 and abrasion pads 408 may be disposable. Abrasion pads 408 may be any suitable abrasive material, such as metal, fiber, sand grit, sandpaper, stone, ceramic, polymer, etc. Abrasion pads 408 may be multilayered and made of one or more different materials. Abrasion pads 408 are attached to shafts 410 or 412 in certain embodiments, and may rotate with such shafts to provide an abrasive cleaning action.

Primary shaft 410 generally attaches to abrasion pad(s) 408 and/or rotates. In certain embodiments, primary shaft 410 attaches (e.g., at an end opposite of where abrasion pads 408 are positioned) to a power tool or a hand crank, which provides rotational motion and rotates primary shaft 410. In particular embodiments, primary shaft 410 attaches (e.g., at an end opposite of where abrasion pads 408 are positioned) to drive shaft 416 (e.g., via shaft gears 418), which provides rotational motion and rotates primary shaft 410. Primary shaft 410, in such embodiments, may rotate one or more abrasion pads 408 in turn to create a cleaning action. Primary shaft 410 may attach to abrasion pads 408 in any suitable manner, and may attach to a power tool, hand crank, or drive shaft 416 in any suitable manner (e.g., via a coupling slot or shaft gears 418). In certain embodiments, some or all of primary shaft 410 is hollow to allow objects connected to or part of a nutplate to pass through primary shaft 410. For example, primary shaft 410 may have a cylindrical opening that allows a portion of a worm (e.g., worm 110 from FIG. 1) to pass through primary shaft 410 such that abrasion pads 408 can make contact with faying surfaces of the nutplates being cleaned. Primary shaft 410 may be made of any suitable material, such as metal (steel, aluminum, etc.), polymer, etc.

Primary shaft 410, in certain embodiments, may directly or indirectly rotate secondary shafts 412. For example, as shown in FIG. 4A, primary shaft 410 rotates four secondary shafts 412 via gears 414. Primary shaft 410 may rotate any suitable number of secondary shafts (including none) in any suitable configuration (e.g., 5 in a line, a "+" configuration, etc.) via any suitable means (e.g., gears, teeth on primary shaft 410 itself and/or secondary shafts 412, pulleys, etc.). In certain embodiments, primary shaft 410 may not couple to an abrasion pad 408 and, instead, may couple to a set of gears and/or one or more secondary shafts that in turn connect to one or more abrasive pads 408. In some embodiments, primary shaft 410 connects to a single abrasion pad 410 that is large enough to clean more than one nutplate at a time.

Secondary shafts 412 generally attach to abrasion pad(s) 408 and/or rotate. In certain embodiments, secondary shafts 412 attach (e.g., at an end opposite of where abrasion pads 408 are positioned) to a power tool or a hand crank, which provides rotational motion and rotates secondary shafts 412. In particular embodiments, secondary shafts 412 attach to primary shaft 410 or drive shaft 416 (e.g., via gears 414 or shaft gears 418, respectively), which provides rotational motion and rotates secondary shafts 412. Secondary shafts 412, in such embodiments, may rotate one or more abrasion pads 408 in turn to create a cleaning action. Secondary shafts 412 may attach to abrasion pads 408 in any suitable manner, and may attach to a power tool, hand crank, or drive shaft 416 in any suitable manner (e.g., via a coupling slot or shaft gears). In certain embodiments, some or all of secondary shafts 412 is hollow to allow objects connected to or part of a nutplate to pass through secondary shafts 412. For example, secondary shafts 412 may have a cylindrical opening that allows a portion of a worm (e.g., worm 110 from FIG. 1 to) pass through secondary shafts 412 such that abrasion pads 408 can make contact with a faying surface of the nutplates being cleaned. Secondary shafts 412 may be made of any suitable material, such as metal (steel, aluminum, etc.), polymer, etc.

Gears 414 generally connect primary shaft 410 to one or more secondary shafts 412, or connect multiple secondary shafts together, such that the rotational motion of one shaft is transferred to one or more other shafts. For example, if primary shaft 410 rotates (e.g., because it is connected to a power tool or drive shaft 416), gears 414 couple primary shaft, directly or indirectly, to one or more secondary shafts 412. Gears 414 may be made of any suitable material, such as metal (steel, aluminum, etc.), polymer, etc.

Drive shaft 416 generally provides rotational motion to primary shaft 410 in certain embodiments. For example, drive shaft 416 may couple to a power tool or hand crank via a coupling slot on draft shaft 416. In addition, drive shaft 416 may be positioned along a different axis than primary shaft 410, and thus may allow for a change in the direction of rotational motion. For example, drive shaft 416 may be positioned horizontally, but may couple with primary shaft 410, which is positioned vertically, via shaft gears 418. Thus, when horizontal drive shaft 416 rotates, it transfers its rotational motion to vertical primary shaft 410. Drive shaft 416 may be positioned along any axis suitable relative to the orientation of primary shaft 410 and may be coupled to primary shaft 410 in any suitable manner, such as gears (shaft gears 418), pulleys, teeth on the respective shafts, etc. Drive shaft 416 may be made of any suitable material, such as metal (steel, aluminum, etc.), polymer, etc.

Shaft gears 418 generally connect one shaft to another shaft while allowing both shafts to rotate. For example, shaft gears 418 may couple drive shaft 416 with primary shaft 410 such that a rotating drive shaft 416 also rotates primary shaft 410, which may or may not have the same orientation as drive shaft 416. Shaft gears 418 may be made of any suitable material, such as metal (steel, aluminum, etc.), polymer, etc.

Base 404, in certain embodiments, contains platform 420 and base coupling component 422. Platform 420 generally provides a structural base, container, and/or attachment point for other components of base 404, some or all of the components of abrasion assembly 402, and/or some or all components of pressure applicator 406. For example, other components of base 404 (e.g., coupling component 422) may rest in, connect to, or be held in place by platform 420 in certain embodiments. In some embodiments, platform 420 contains within itself some or all of abrasion assembly 402, such as some or all of drive shaft 416, primary shaft 410, secondary shafts 412, gears 414, and shaft gears 416. Platform 420 may be configured to rest on a surface, such as a table, such that abrasion pads 408 rotate horizontally during operation of MURAT 400. Moreover, platform 420 may couple/attach to pressure applicator 406 (including one or more components thereof), for example, pressure applicator coupling component 424 using any suitable connection.

Platform 420 may also have an opening that allows some of primary shaft 410 or drive shaft 416 to pass through in some embodiments. In certain embodiments, an end of primary shaft 410 opposite to an end connected to abrasive pads 408 passes through an opening in platform 420 in order to connect with a power tool or hand crank for rotational motion. In certain embodiments, an end of drive shaft 416 passes through an opening in platform 420 in order to connect with a power tool or hand crank for rotational motion. Platform 420, in some embodiments, does not rotate when primary shaft 410 rotates, e.g., because platform 420 and/or coupling component 422 hold abrasion assembly 402 such that components of abrasion assembly 402 do not make contact, or make low-friction contact with base 404. Platform 420 may have any suitable shape and may be made of any suitable material, such as metal (steel, aluminum, etc.), polymer, etc.

Coupling component 422 generally couples/attaches to pressure applicator 406 (including one or more components thereof), for example, pressure applicator coupling component 424 using any suitable connection. In an example embodiment, coupling component 422 may have protrusions that are configured to connect to grooves on pressure applicator coupling component 424, or vice versa. Coupling component 422 connects to platform 420 via any suitable connection (e.g., welding, snaps or other fasteners, press fitting, hinges, etc.) in some embodiments. In some embodiments, coupling component 422 and platform 420 may be a single piece of material or otherwise permanently attached (e.g., cast together, joined with adhesives, etc.).

Coupling component 422 or pressure applicator coupling component 424, in certain embodiments, may be configured to rotate to lock/seat protrusions into grooves (e.g., as described with regard to FIGS. 2 and 3), thus connecting base 404 (e.g., coupling component 422 and platform 420) to pressure applicator 406. Coupling component 422, in particular embodiments, may have more than one set of grooves (or protrusions), where each different set of grooves are meant to be used with different sized and shaped nutplates. For example, if a first type of nutplate to be cleaned is relatively thin, then a first set of grooves located closer to pressure applicator 406 on platform 420 may be used. Similarly, if a first type of nutplate to be cleaned is relatively thin, then a first set of grooves on pressure applicator coupling component 424 located closer to base 404 may be used. Alternatively, if a second type of nutplate to be cleaned is relatively thick, then a second set of grooves located further from pressure applicator 406 on platform 420 may be used. Similarly, if a second type of nutplate to be cleaned is relatively thick, then a second set of grooves located further from base 404 on pressure applicator coupling component 424. Moreover, pressure applicator coupling component 424 may have different sets of protrusions located on different portions of pressure applicator coupling component 424 to accommodate nutplates of different shapes and sizes. Coupling component 422 may have any suitable shape and may be made of any suitable material, such as metal (steel, aluminum, etc.), polymer, etc.

In certain embodiments, base 404, including any component thereof, may hold abrasion pads 408 within at least one of base 404 and pressure applicator 406 during nutplate cleaning.

Pressure applicator 406, in certain embodiments, contains pressure applicator coupling component 424, nutplate holder 426, and handle 428. Pressure applicator coupling component 424, in general, attaches to base 404, e.g., coupling component 422 or platform 420, in certain embodiments. In particular embodiments, pressure applicator coupling component 424 acts as an attachment point between base 404 and pressure applicator 406 (e.g. be connecting to base 404 via protrusions, grooves, or any other suitable means). While the embodiment of FIG. 4A shows protrusions on coupling component 422 and grooves on pressure applicator coupling component 424, in other embodiments pressure applicator coupling component 424 may have protrusions and coupling component 422 may have grooves. In addition, pressure applicator coupling component 424 may provide stability during cleaning, as use of grooves and protrusions (or other types of connections) may reduce movement between pressure applicator 406 and base 404 during cleaning.

Pressure applicator coupling component 424 also attaches to nutplate holder 426 in certain embodiments, e.g., via welding, casting, or any other suitable means. In certain embodiments, pressure applicator coupling component 424 and nutplate holder 426 are a single piece of material, such as metal or polymer (e.g., deposited by a 3D printer). Furthermore, pressure applicator coupling component 424 may also attach to nutplate holder 426 by grooves and protrusions on pressure applicator coupling component 424 and nutplate holder 426, respectively, or vice versa.

Pressure applicator coupling component 424 may, in some embodiments, be customized or otherwise configured to set pressure applicator 406 (and specifically nutplate holder 426) a particular distance from abrasion pads 408 to accommodate a particular nutplate type or style, and the dimensions of pressure applicator coupling component 424 (e.g., its height/length) may differ for different nutplates in order to ensure that the nutplate being cleaned is positioned properly and/or has enough applied force against abrasion pads 408 when MURAT 400 is in use. Pressure applicator coupling component 424 may have any suitable shape and may be made of any suitable material, such as metal (steel, aluminum, etc.), polymer, etc.

Nutplate holder 426 generally holds multiple nutplates or a portion of multiple nutplates during cleaning. For example, nutplate holder 426 may be shaped, carved, configured, etc. to physically seat (hold) a portion of multiple nutplates. In certain embodiments, the seated portion of the nutplate is not the surface being cleaned (e.g., the faying surface). As an example, FIG. 4B shows five rectilinear depressions, each with an opening 430, which are each configured to seat a first portion of a nutplate such that a second portion of the nutplate can be accessed and cleaned by abrasion pads 408. Nutplate holder 426 may connect with pressure applicator coupling component 424, in certain embodiments, in any suitable manner. In addition, nutplate holder 426 may connect with handle 428 in certain embodiments in any suitable manner (e.g., screws, bolts, welding, casting, etc.). Nutplate holder 426 may, in some embodiments, be customized or otherwise configured to hold a particular nutplate type or style, and the dimensions of nutplate holder 426 (e.g., its height/length or the dimensions of the rectilinear depressions) may differ for different nutplates in order to ensure that the nutplate being cleaned is positioned properly and/or has enough applied force against abrasion pads 408 when MURAT 400 is in use.

In addition, nutplate holder 426 may have one or more openings (holes) 430 for protrusions from nutplates (e.g., silicon worms or dome caps) to rest during cleaning in certain embodiments. These protrusions from nutplates being cleaned may extend into nutplate holder 426, which may have a hollow cavity or may be solid. Nutplate holder 426 may have any suitable shape and may be made of any suitable material, such as metal (steel, aluminum, etc.), polymer, etc.

Handle 428 generally provides a location for an operator (human or machine) to grip pressure applicator 406. For example, an operator may grip handle 428 to position pressure applicator 406 on base 404 prior to cleaning. As another example, handle 428 may allow an operator to apply pressure to nutplates against abrasion pads 408 during cleaning, which may provide a more complete cleaning action when using MURAT 400. In certain embodiments, pressure applied via handle 428 causes nutplate holder 426 to be pressed downward towards abrasion pads 408, thus helping to apply pressure to nutplates that are seated in nutplate holder 426 against abrasion pads 408. In this way, handle 428 may ensure that abrasion pads 408 make sufficient contact with (and thus clean) nutplates held by nutplate holder 426 in MURAT 400 in some embodiments. Pressure during cleaning may be provided by the coupling/locking mechanism between coupling component 422 and pressure applicator coupling component 424 in certain embodiments. Handle 428 may have any suitable shape and may be made of any suitable material, such as metal (steel, aluminum, etc.), polymer, etc.

Some or all of the components of MURAT 400 can be made by any suitable means, such as with a 3D printer, by casting, etc.

While FIGS. 4A and 4B illustrate a particular embodiment of a MURAT 400 having particular components, this disclosure contemplates multiple unit rotary abrasion tools having some or all of the described components, as well as additional components not described. Components of the present disclosure may be any suitable shape and may be in any suitable configuration.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or."

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
an abrasion assembly, comprising:
one or more abrasion pads configured to clean a faying surface of each of a plurality of nutplates; and
a first shaft attached to at least one of the one or more abrasion pads and configured to rotate at least one of the one or more abrasion pads during cleaning of the nutplates, wherein cleaning the nutplates comprises abrading each of the faying surfaces with at least one of the one or more abrasion pads;
a base comprising a first coupling component, the base configured to attach to a pressure applicator via the first coupling component; and
the pressure applicator, the pressure applicator comprising:
a second coupling component configured to at least partially surround the first coupling component of the base; and
a nutplate holder comprising a plurality of rectilinear depressions, each rectilinear depression configured to seat a portion of one of the plurality of nutplates such that faying surfaces of the nutplates can be abraded by the one or more abrasion pads, wherein the pressure applicator is configured to:
attach to and detach from the base via the second coupling component; and
apply pressure to the plurality of nutplates such that each of the plurality of nutplates contact at least one of the one or more abrasion pads during the cleaning of the nutplates;
wherein the one or more abrasion pads protrude at least partially through a surface of the first coupling component of the base;
wherein the abrasion assembly is configured to rotate the one or more abrasion pads within at least one of the base and the pressure applicator during the cleaning of the nutplates; and
wherein the one or more abrasion pads and the first shaft each comprise an opening configured to accept a protrusion attached to each of one or more of the nutplates during the cleaning of the nutplates.

2. The system of claim 1, wherein the pressure applicator comprises one or more openings configured to accept a protrusion attached to each of one or more of the nutplates during the cleaning of the nutplates.

3. The system of claim 1, wherein at least one of the one or more abrasion pads is detachable from the first shaft.

4. The system of claim 1, wherein the pressure applicator further comprises a handle configured to apply pressure to the nutplate holderduring the cleaning of the nutplates.

5. The system of claim 1, wherein the abrasion assembly further comprises one or more second shafts, wherein each of the one or more second shafts is:
attached to at least one of the one or more abrasion pads; and
configured to rotate the at least one of the one or more abrasion pads during the cleaning of the nutplates.

6. The system of claim 5, where in the abrasion assembly further comprises one or more gears configured to, during the cleaning of the nutplates, transfer rotational motion from the first shaft to the one or more second shafts.

7. The system of claim 1, wherein the first or second coupling component comprises one or more protrusions configured to reduce movement between the abrasion assembly and the pressure applicator.

8. A system, comprising:
one or more abrasion pads configured to clean a faying surface of each of a plurality of nutplates;
a base comprising a first coupling component, the base configured to:
attach to a pressure applicator via the first coupling component; and
hold the one or more abrasion pads within at least one of the base and the pressure applicator during the cleaning of the nutplates, wherein cleaning the nutplates comprises abrading each of the faying surfaces with at least one of the one or more abrasion pads; and
the pressure applicator comprising:
a second coupling component configured to at least partially surround the first coupling component of the base; and
a nutplate holder comprising a plurality of rectilinear depressions, each rectilinear depression confi2ured to seat a portion of one of the plurality of nutplates such that faying surfaces of the nutplates can be abraded by the one or more abrasion pads, wherein the pressure applicator is configured to:
attach to and detach from the base via the second coupling component; and
apply pressure to the plurality of nutplates such that each of the plurality of nutplates contact at least one of the one or more abrasion pads during the cleaning of the nutplates;
wherein the one or more abrasion pads protrude at least partially through a surface of the first coupling component of the base; and
wherein the one or more abrasion pads and a shaft coupled to the one or more abrasion pads each comprise an opening configured to accept a protrusion attached to each of one or more of the nutplates during the cleaning of the nutplates.

* * * * *